United States Patent
Yamamoto et al.

(10) Patent No.: US 9,180,914 B2
(45) Date of Patent: Nov. 10, 2015

(54) SUPPORT STRUCTURE FOR VEHICLE

(71) Applicant: NISSIN KOGYO CO., LTD., Nagano (JP)

(72) Inventors: Naoaki Yamamoto, Nagano (JP); Takafumi Maruyama, Nagano (JP); Katsumi Iwasa, Nagano (JP); Ryuji Furusawa, Nagano (JP); Takashi Kuroiwa, Nagano (JP); Hideaki Kobayashi, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 13/737,484

(22) Filed: Jan. 9, 2013

(65) Prior Publication Data

US 2013/0181480 A1 Jul. 18, 2013

(30) Foreign Application Priority Data

Jan. 13, 2012 (JP) ................................. 2012-005253

(51) Int. Cl.
*B60K 5/12* (2006.01)
*B62D 25/00* (2006.01)
*B62D 7/18* (2006.01)

(52) U.S. Cl.
CPC . *B62D 25/00* (2013.01); *B60K 5/12* (2013.01); *B62D 7/18* (2013.01)

(58) Field of Classification Search
CPC ........... B60K 5/12; B60K 1/00; B62D 25/082
USPC ................. 180/312, 311, 291, 89.1; 280/107; 296/187.01
See application file for complete search history.

(56) References Cited

U.S. PATENT DOCUMENTS

| 5,954,309 | A  | * | 9/1999  | Kato et al. ..................... 248/636 |
| 6,511,059 | B2 | * | 1/2003  | Seynaeve ................. 267/140.13 |
| 7,140,633 | B2 | * | 11/2006 | Audo et al. ................ 280/438.1 |
| 7,959,200 | B2 | * | 6/2011  | Voglmayr .................. 296/26.05 |

(Continued)

FOREIGN PATENT DOCUMENTS

| CN | 1954938 A | 5/2007 |
| CN | 102248881 A | 11/2011 |
| JP | UM H03-026337 | 6/1991 |

(Continued)

OTHER PUBLICATIONS

Wikipedia entry for "casting", http://en.wikipedia.org/wiki/Casting, Feb. 25, 2015.*

(Continued)

*Primary Examiner* — Keith Frisby
(74) *Attorney, Agent, or Firm* — Andrew M. Calderon; Roberts Mlotkowski Safran & Cole, P.C.

(57) ABSTRACT

A support structure for a vehicle is interposed between a vehicle body and a vehicle part and is connected with fastening members to support the vehicle part. The support structure is made of a non-ferrous light alloy. Among connecting surfaces of the support structure to which the vehicle body and the vehicle part are connected, an electrochemical corrosion inhibitor is applied to a connecting surface that is located on a lower side, in a vertical direction of the vehicle, of one of the vehicle body and the vehicle part. The one of the vehicle body and the vehicle part corresponds to the applied connecting surface.

16 Claims, 7 Drawing Sheets

(56) References Cited

U.S. PATENT DOCUMENTS 8,409,725 B2 * 4/2013 Hashimura et al. ........... 428/653
2007/0107970 A1 5/2007 Kobayashi

FOREIGN PATENT DOCUMENTS

| JP | H043704425 A | 12/1992 |
| JP | 06117424 | 4/1994 |
| JP | 09303440 | 11/1997 |
| JP | 2001105896 A | 4/2001 |
| JP | 2005054910 | 3/2005 |
| JP | 2005239026 | 9/2005 |
| JP | 2005343418 | 12/2005 |
| JP | 2010065842 | 3/2010 |
| JP | 2010221923 | 10/2010 |
| WO | WO-2005059386 | 6/2005 |

OTHER PUBLICATIONS

Wikipedia entry for "spotface", http://en.wikipedia.org/wiki/Spotface, Feb. 25, 2015.*
Japanese Office Action dated Oct. 29, 2013, 8 pages.
Decision of Rejection for the related JP Application No. 2012-005253 drafted on Mar. 14, 2014 and issued on Mar. 25, 2014, 4 pages.
Chinese Office Action dated Jul. 20, 2015 for related CN Application No. 201310080096.2, 16 pages.

* cited by examiner

SUPPORT STRUCTURE FOR VEHICLE

CROSS REFERENCE TO RELATED APPLICATION

This application is based on and claims priority under 35 U.S.C. §119 to Japanese Patent Application No. 2012-5253 (filed on Jan. 13, 2012), the entire contents of which are incorporated herein by reference.

BACKGROUND

1. Technical Field

The invention relates to a support structure for a vehicle such as a mount bracket that supports, for example, an engine.

2. Description of the Related Art

Examples of a support structure for a vehicle include an engine mount bracket. The engine mount bracket is disposed between a body and an engine to support the engine on a vehicle body. In association with a demand for a reduction in vehicle weight, castings (by the gravity die casting (GDC) process, the die casting (DC) process, or the like) made of a non-ferrous light alloy such as aluminum, copper, magnesium or an alloy thereof have been used for the support structures that support a vehicle part such as an engine. On the other hand, most of vehicle bodies, vehicle parts such as an engine and fastening members (bolts and the like) for fastening the vehicle part to a support structure for a vehicle are made of iron. When these dissimilar metals are combined together, a local corrosion cell may be formed on a surface of the support structure, which leads to as a so-called electrochemical corrosion reaction in which an aluminum alloy is dissolved.

In order to prevent the electrochemical corrosion reaction, for example, JP 2005-343418 A describes applying an corrosion proof treatment to an aluminum adapter (an example of a support structure for a vehicle) used to mount an engine on an iron rear frame (a vehicle body) by forming an insulating coating on the aluminum adapter.

Also, JP UM H03-026337 Y describes applying an anti-rust coating to outer surfaces of an aluminum holding member and an iron mounting bracket that is brought into contact with the holding member so as to cover the outer surfaces with the anti-rust coating.

SUMMARY

However, particularly in an engine compartment in a front portion of a vehicle, in order to reduce the weight of the vehicle and/or to absorb impact at a time of an accident, vehicle parts such as an engine are mounted on or above various frame members and a gap(s) are formed in a lower portion of the engine compartment. Splashed muddy water enters the engine compartment through the gaps and adheres thereto, which is likely to accelerate the electrochemical corrosion reaction.

Also, there may be a case where washers are interposed between the frame members and the vehicle parts so as to prevent the occurrence of the electrochemical corrosion reaction. However, this countermeasure leads to increase of the number of parts.

Further, in order to secure a fastening axis of a bolt appropriately, in general, a portion of a casting (a bearing surface of the casting) which is brought into contact with a bearing surface of the bolt is machined to form a flat surface portion by spotfacing the casting. Therefore, step portions are formed between the flat surface portions and other portions of the casting. Splashed muddy water is likely to adhere to the stepped portions from a lower portion of the vehicle, which is a cause for acceleration of the electrochemical corrosion reaction.

In view of the above circumstances, the invention has been made and provides a support structure for a vehicle that can prevent occurrence of the electrochemical corrosion reaction.

(1) A support structure for a vehicle is made of a non-ferrous light alloy, is to be interposed between a vehicle body and a vehicle part, and is to be connected to the vehicle body and the vehicle part with fastening members to support the vehicle part. Among connecting surfaces of the support structure to which the vehicle body and the vehicle part are connected, an electrochemical corrosion inhibitor is applied to a connecting surface that is located on a lower side, in a vertical direction of the vehicle, of one of the vehicle body and the vehicle part, the one of the vehicle body and the vehicle part corresponding to the applied connecting surface.

With the configuration of (1), it is possible to prevent the occurrence of the electrochemical corrosion reaction in the support structure.

(2) A support structure for a vehicle is made of a non-ferrous light alloy, is to be interposed between a vehicle body and a vehicle part, and is to be connected to the vehicle body and the vehicle part with fastening members to support the vehicle part. At least one of the fastening members is fastened at a mounting flat surface portion that is formed on a surface of the supporting structure. An electrochemical corrosion inhibitor is applied to the mounting flat surface portion.

With the configuration of (2), it is possible to prevent the occurrence of the electrochemical corrosion reaction in the support structure.

(3) In the support structure of any one of (1) and (2), a film thickness of the electrochemical corrosion inhibitor may be in a range of from 20 μm to 50 μm.

(4) In the support structure of any one of (1) to (3), the support structure may be a mount bracket.

(5) In the support structure of any one of (1) to (3), the support structure may be a steering knuckle.

(6) In the support structure of any one of (1) to (5), the support structure may be manufactured by casting.

(7) In the support structure of any one of (1) to (6), the non-ferrous light alloy may be selected from a group consisting of aluminum, an aluminum alloy, copper, a copper alloy, magnesium, and a magnesium alloy.

DETAILED DESCRIPTION

Hereinafter, embodiments of the invention will be described in detail based on the accompanying drawings.

Figure 1:
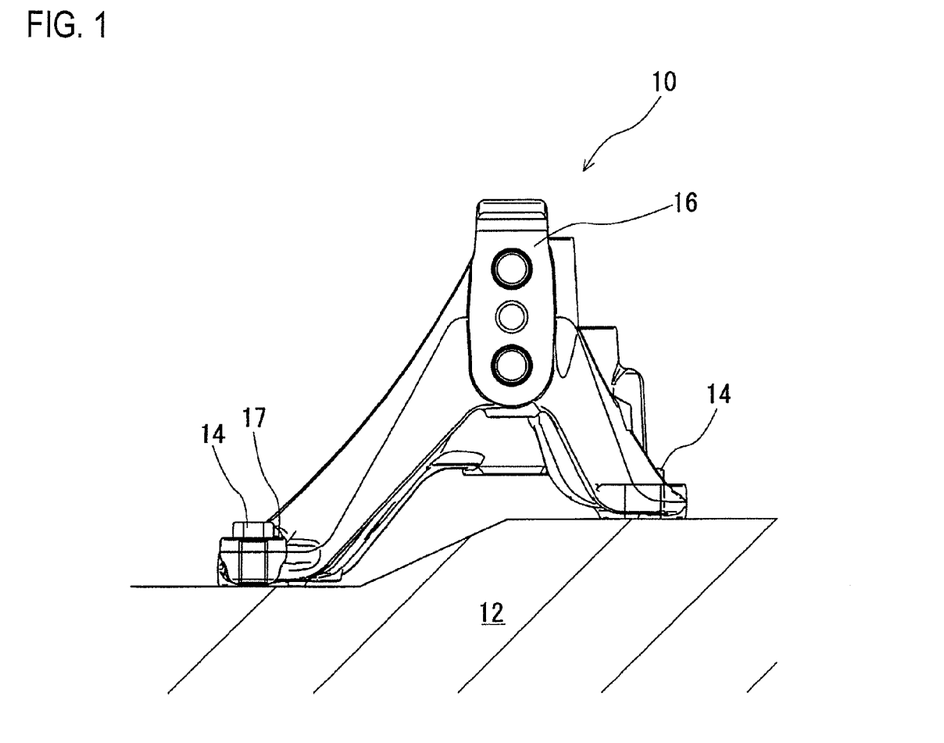
FIG. 1 is a front view of a mount bracket.
Figure 2:
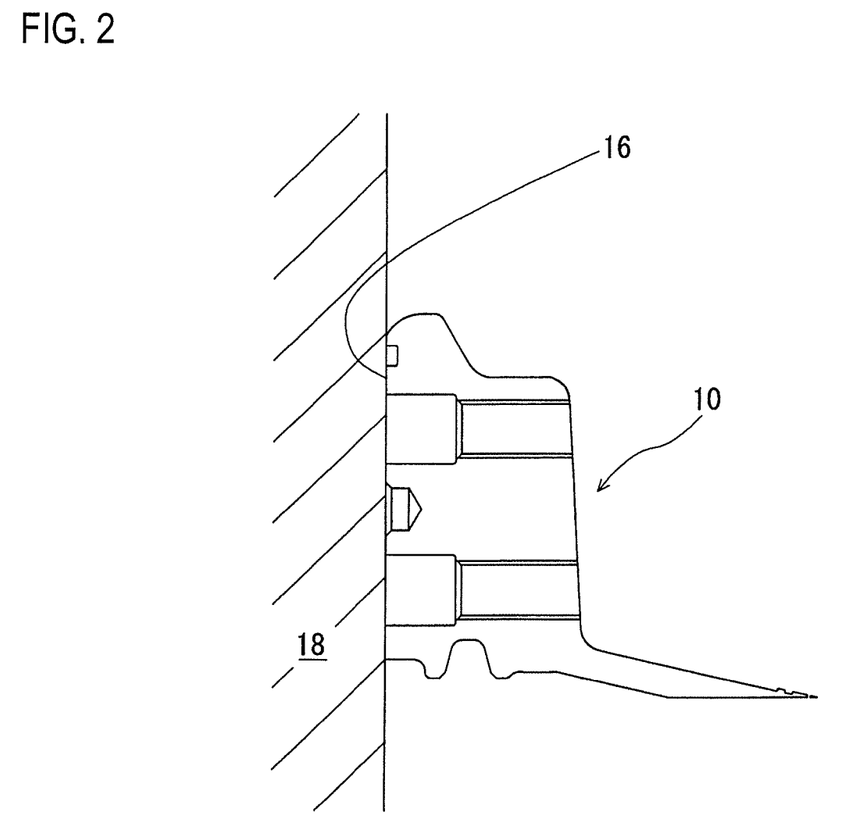
FIG. 2 is a partial side view of the mount bracket.
Figure 3:
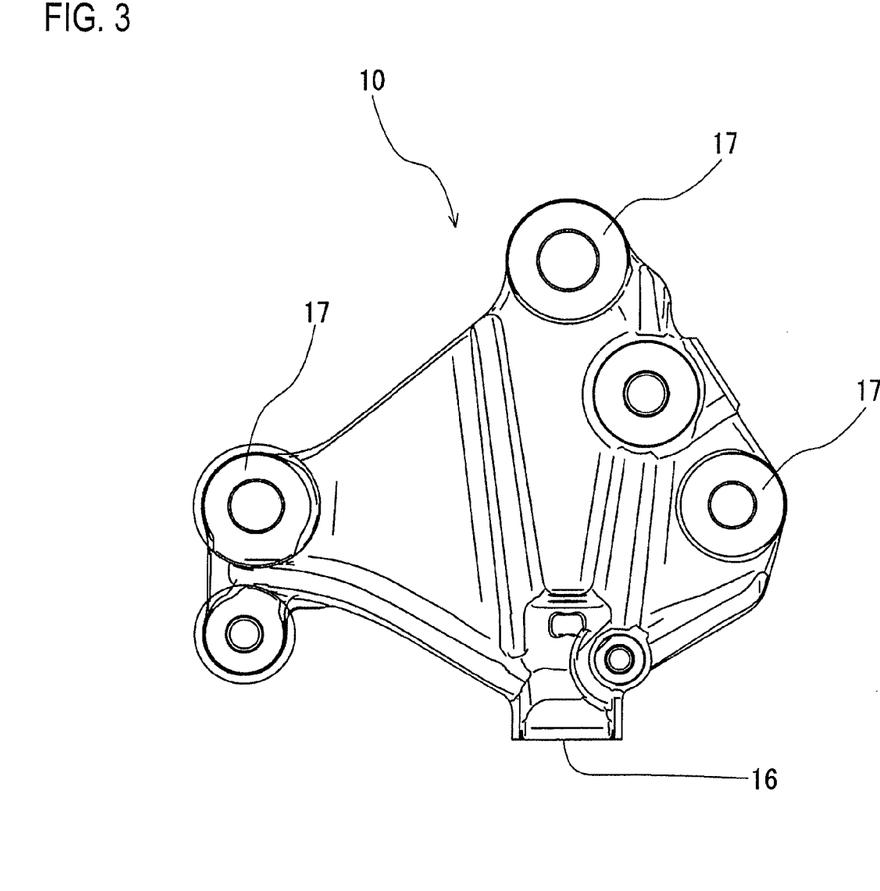
FIG. 3 is a plan view of the mount bracket.

FIG. 1 is a front view showing an example of a mount bracket 10 that is attached to a vehicle body to support, for example, an engine, a transmission, or the like. FIG. 2 is a partial side view of the mount bracket 10. FIG. 3 is a plan view of the mount bracket 10.

In order to reduce the weight of a vehicle, a casting made of for example, aluminum or a non-ferrous light alloy such an aluminum alloy is used as the mount bracket 10.

As shown in FIG. 1, the mount bracket 10 is fixed to an iron body frame 12, serving as a vehicle body member, at plural positions with bolts 14 serving as fastening members. The bolts 14 are made of iron (such as a carbon steel or an alloy steel). Also, a vehicle part 18 such as an engine is mounted on a mounting surface (connecting surface) 16 of the mount bracket 10 with not-shown bolts which serve as the fastening members and which are made of iron (such as a carbon steel or an alloy steel). It should be noted that an appropriate number of mount brackets 10 are used to fix the vehicle part 18.

The mount bracket 10 supports the vehicle part 18 from below. The mount bracket 10 is located on a lower side of the vehicle part 18 in a vertical direction of the vehicle. Also, there are many gaps on a road surface side of an engine compartment. Therefore, splashed muddy water is likely to enter the engine compartment and adhere to the mount bracket 10. Thereby, the electrochemical corrosion reaction would easily occur between (i) the mount bracket 10 and (ii) the body frame 12 and the vehicle part, which are made of dissimilar metals to that of the mount bracket 10 if no measure were to be taken.

Then, in this embodiment, an electrochemical corrosion inhibitor (not shown) is applied to the mounting surface 16 of the mount bracket 10, which the vehicle part 18 is brought into contact with, and to contact surfaces 17 of the mount bracket 10, which the bolts 14 are brought into contact with. The electrochemical corrosion inhibitor may be applied by the dipping process or the like only to required positions. The electrochemical corrosion inhibitor may also be applied to a contact surface of a counterpart member (for example, the bearing surface of the bolt 14) which the mount bracket 10 is brought into contact with.

Figure 4:
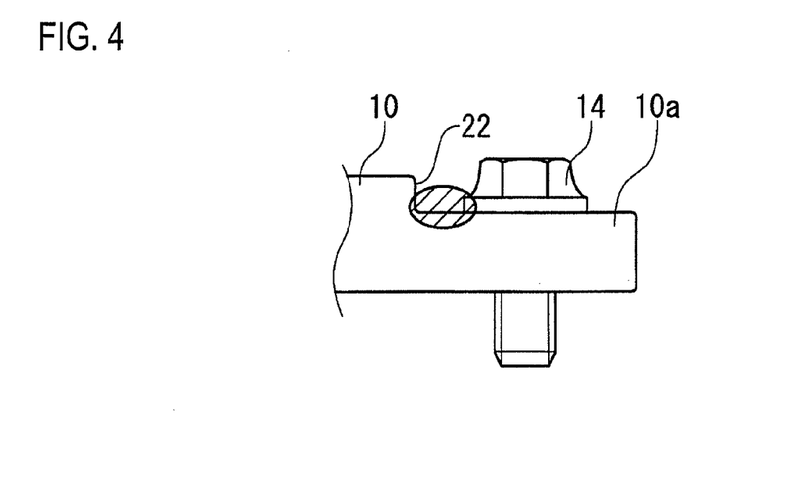
FIG. 4 is a front view showing a state in which a flat surface portion is formed by spotfacing.
Figure 5:
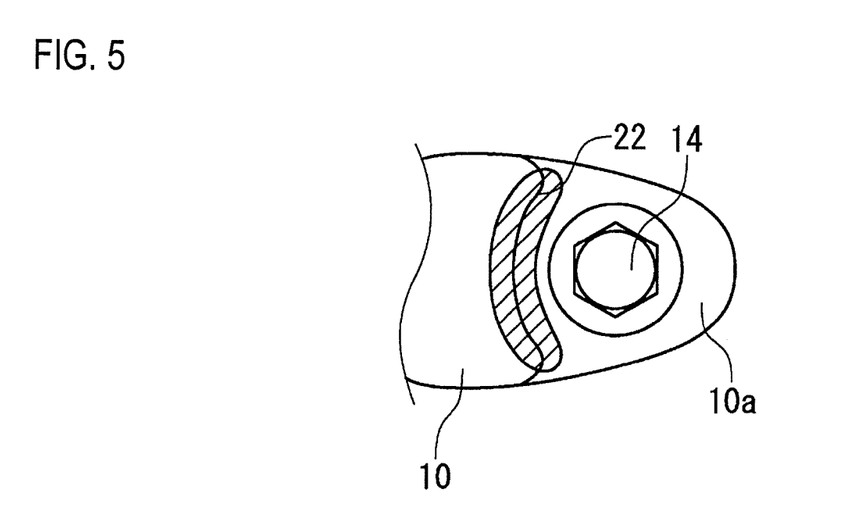
FIG. 5 is a plan view of FIG. 4.

As shown in FIGS. 4 and 5, in order to secure fastening axes of the bolts 14 appropriately, portions of the mount bracket 10 which are brought into contact with bearing surfaces of the bolts 14 are machined to form flat surface portions 10a (bearing surfaces of the mount bracket 10) by spotfacing. Therefore, step portions 22 are formed between the flat surface portions 10a and other portions of the mount bracket 10. Splashed muddy water entering the engine compartment from the lower portion of the vehicle is likely to adhere to the step portions 22, which is one of causes for the acceleration of the electrochemical corrosion reaction. Then, the electrochemical corrosion inhibitor is applied to the flat surface portions 10a.

Figure 6:
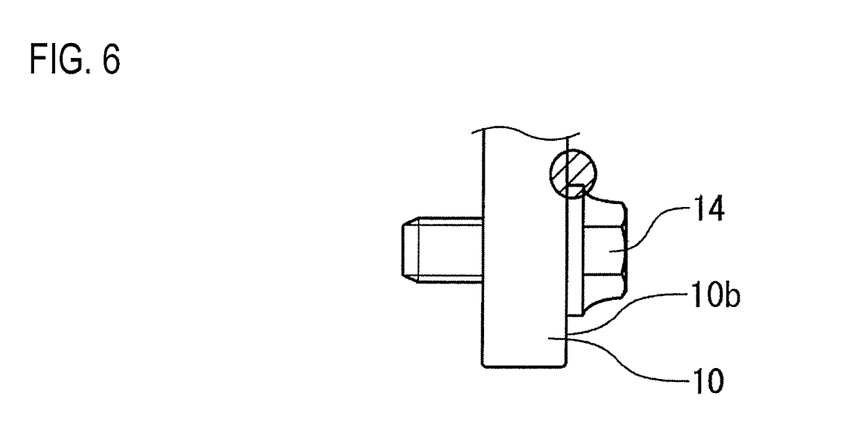
FIG. 6 is an explanatory diagram showing a case where no flat surface portion is formed.

Also, as shown in FIG. 6, even in the case where the bolt 14 is attached to the mount bracket 10 without the flat surface portion 10a being formed, if a contact surface 10b of the mount bracket 10 which the bolt 14 is brought into contact with faces the vertical direction, water tends to stay easily at an upper side thereof. Therefore, the electrochemical corrosion inhibitor is applied to the contact surfaces 10b of the mount bracket 10 which the bolt 14 is brought into contact with.

Also, in addition to the contact surfaces 10b of the mount bracket 10 which the bolts 14 are brought into contact with, as can be seen from FIG. 2, when the mounting surface (contacting surface) 16 of the mount bracket 10 on which the vehicle part 18 or the like is mounted faces the vertical direction, water tends to stay easily at an upper portion thereof. Therefore, the electrochemical corrosion inhibitor is applied to the mounting surface 16 of the mount bracket 10.

There is no particular limitation on types of the electrochemical corrosion inhibitor. Any electrochemical corrosion inhibitor can be used so long as it has good adhesion to an application surface, good weathering resistance, and electrical insulation property and can prevent the electrochemical corrosion reaction between dissimilar metals. Examples of the electrochemical corrosion inhibitor include DRALL (registered trademark) produced by NIHON RUSPERT Co., Ltd. Unlike the cation coating process and the electrostatic coating process, the process of applying DRALL (registered trademark) does not use electricity. Therefore, a product shape does not affect the uniformity of DRALL applied thereon. Also, DRALL (registered trademark) dries at normal temperatures. Therefore, the baking process is not required, which can reduce the number of processes. In addition, DRALL (registered trademark) can be applied to a surface of a light alloy such as aluminum with good adhesion.

There is no limitation on the thickness of the applied electrochemical corrosion inhibitor. However, in order to prevent a pinhole or the like from being formed, the applied electrochemical corrosion inhibitor preferably has 20 μm or more in thickness, and more preferably about 30 μm. Also, an upper limit of the thickness of the applied electrochemical corrosion inhibitor is preferably about 50 μm from the viewpoint of application properties (flowability resulting from viscosity) and costs.

In the above embodiment, the mount bracket 10 has been described as the example of the support structure. However, the support structure is not limited thereto.

For example, the invention can also be applied to a steering knuckle as the support structure. The steering knuckle transfers a force input from a steering wheel to a wheel. The steering knuckle has a complex and odd shape containing various mounting arms. Therefore, a casting is used as the steering knuckle. In addition, in order to reduce the weight of the steering knuckle, a casting made of aluminum or an aluminum alloy is used. Similarly to the mount bracket 10, the electrochemical corrosion reaction would occur between the steering knuckle and various connecting parts made of dissimilar metals to the steering knuckle if no measures were to be taken. A wheel is mounted on the steering knuckle, and the steering knuckle is disposed at a lower portion of the vehicle. Therefore, splashed muddy water would notably adhere to the steering knuckle. Accordingly, it is particularly important to prevent the electrochemical corrosion.

Figure 7:
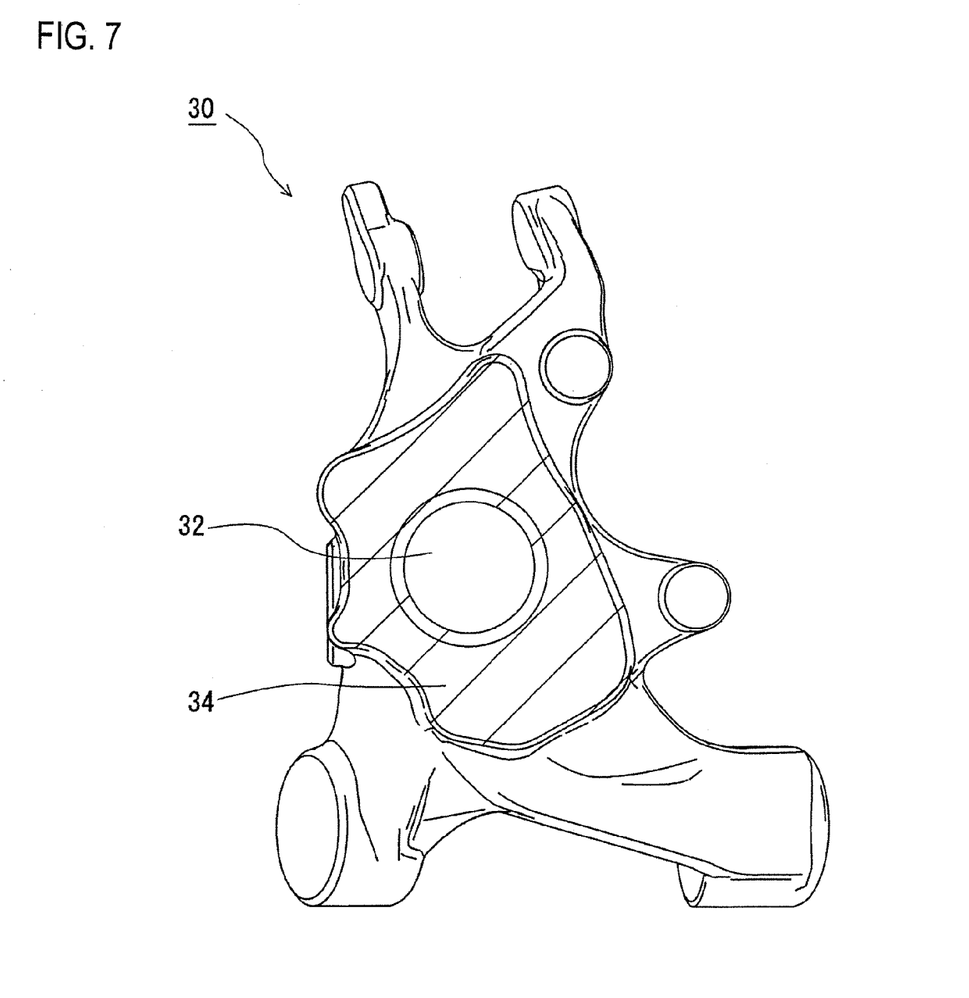
FIG. 7 is a front view of a steering knuckle.
Figure 8:
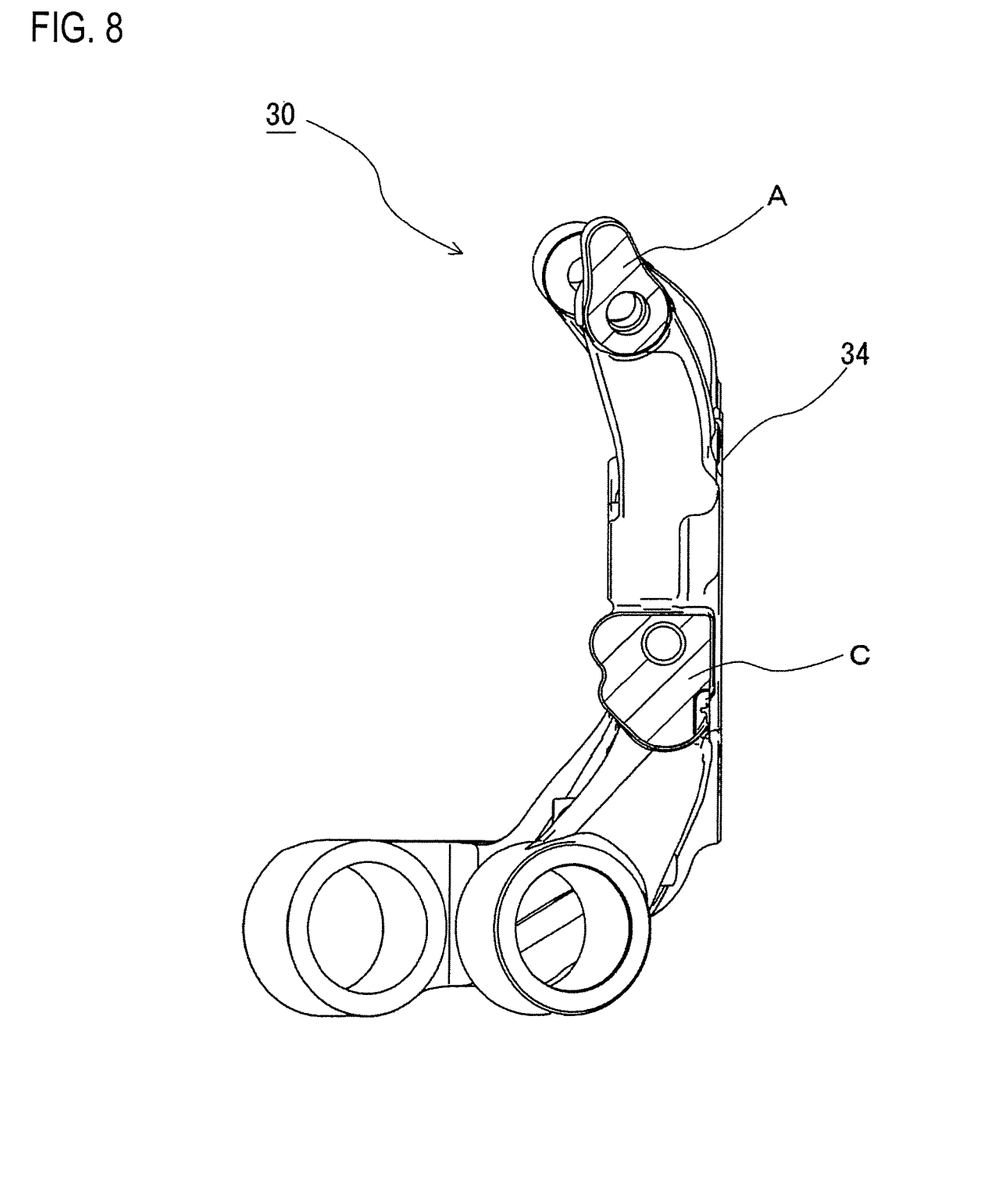
FIG. 8 is a left side view of the steering knuckle.
Figure 9:
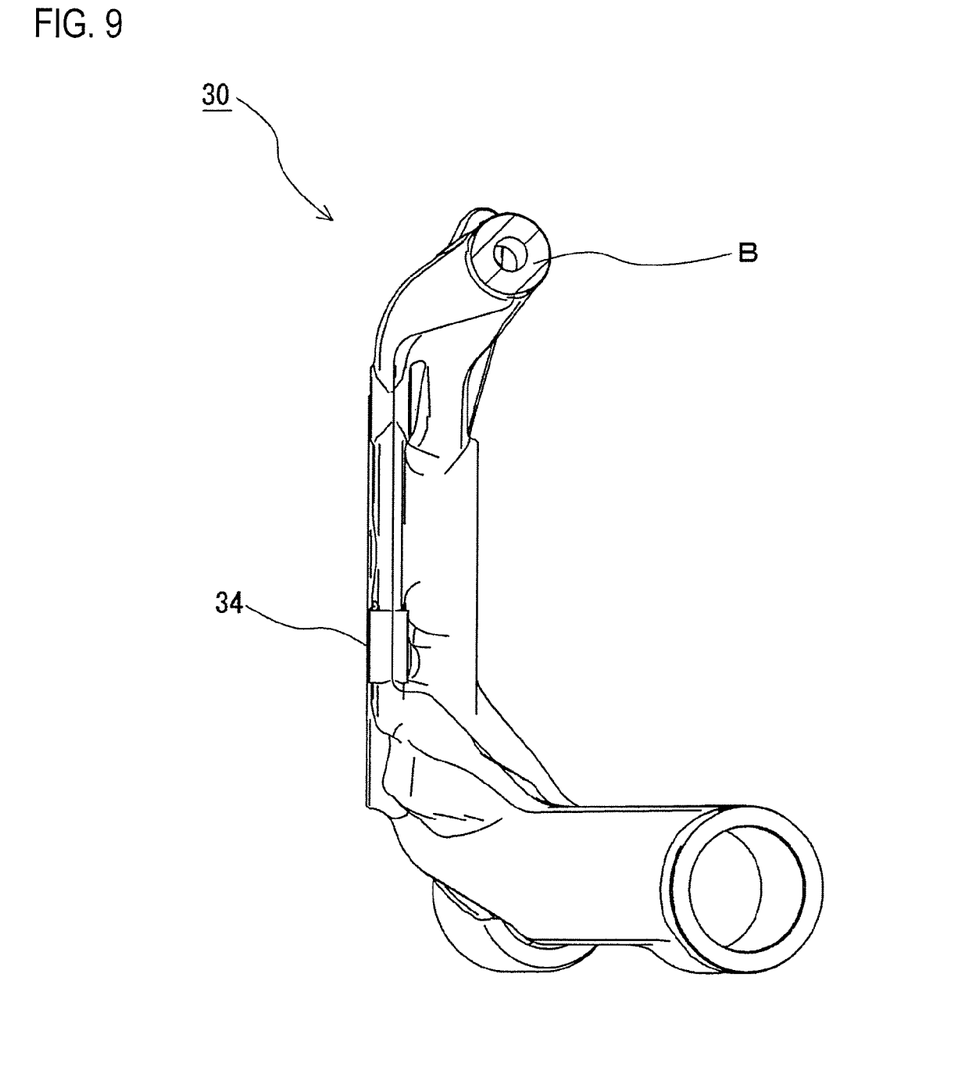
FIG. 9 is a right side view of the steering knuckle.

FIG. 7 is a front view showing an example of a steering knuckle 30. FIG. 8 is a left side view thereof. FIG. 9 is a right side view thereof.

Reference numeral 32 denotes a cylindrical fitting hole to which an axle (bearing) is fixedly fitted. A dust plate (mud guard: an example of the vehicle part), not shown, is fixed to a mounting surface 34 which surrounds the periphery of the cylindrical fitting hole 32 with a bolt (not shown). An electrochemical corrosion inhibitor is applied to the mounting surface 34. Also, the electrochemical corrosion inhibitor may be applied to connecting surfaces A, B, C of the mounting arms of the steering knuckle 30 which body-side connecting members (such as an upper suspension, a lower suspension, and a steering arm) are connected to.

In the embodiments described heretofore, aluminum and the alloy thereof are listed as the examples of the non-ferrous light alloy. However, copper, magnesium or an alloy thereof may be adopted as a non-ferrous light alloy.

Also, the support structure is not limited to a casting manufactured by GDC or the like, but may be an article manufactured by forging, pressing or cutting.

What is claimed is:

1. A cast support structure for a vehicle that is made of a non-ferrous light alloy, that is to be interposed between a vehicle body and a vehicle part, and that is to be connected to the vehicle body and the vehicle part with fastening members to support the vehicle part, wherein
    among connecting surfaces of the cast support structure to which the vehicle body and the vehicle part are connected, an electrochemical corrosion inhibitor is applied to a connecting surface that is located on a lower side, in a vertical direction of the vehicle, of the vehicle part,
    the electrochemical corrosion inhibitor is applied to an exposed flat contact surface in which a bolt is brought into contact with the support structure to connect the support structure to an engine compartment of the vehicle body,
    the exposed flat contact surface is located on an opposite side of the cast support structure to one of the connecting surfaces between the cast support structure and the engine compartment of the vehicle body, and
    a step portion is formed, by spotfacing, on a surface of the cast support structure so that the step portion continues with the exposed flat contact surface.

2. The support structure according to claim 1, wherein a film thickness of the electrochemical corrosion inhibitor is in a range of from 20 μm to 50 μm.

3. The support structure according to claim 1, wherein the support structure is a mount bracket.

4. The support structure according to claim 1, wherein the non-ferrous light alloy is selected from a group consisting of aluminum, an aluminum alloy, copper, a copper alloy, magnesium, and a magnesium alloy.

5. The support structure according to claim 1, wherein the electrochemical corrosion inhibitor is applied to a bearing surface of the bolt.

6. A cast support structure for a vehicle that is made of a non-ferrous light alloy, that is to be interposed between a vehicle body and a vehicle part, and that is to be connected to the vehicle body and the vehicle part with fastening members to support the vehicle part, wherein
    at least one of the fastening members is fastened at a mounting flat surface portion that is formed on a surface of the cast support structure to fasten the cast support structure to an engine compartment of the vehicle body,
    an electrochemical corrosion inhibitor is applied to exposed portions of the mounting flat surface portion in which the at least one of the fastening members contact, and
    a step portion is formed, by spotfacing, on the surface of the cast support structure so that the step portion continues with the mounting flat surface portion.

7. The support structure according to claim 6, wherein a film thickness of the electrochemical corrosion inhibitor is in a range of from 20 μm to 50 μm.

8. The support structure according to claim 6, wherein the support structure is a mount bracket.

9. The support structure according to claim 6, wherein the non-ferrous light alloy is selected from a group consisting of aluminum, an aluminum alloy, copper, a copper alloy, magnesium, and a magnesium alloy.

10. The support structure according to claim 6, wherein the electrochemical corrosion inhibitor is applied to a mounting surface of the cast support structure, which the vehicle part is brought into contact with and a bearing surface of the at least one of the fastening members.

11. A cast support structure for a vehicle, the support structure to be interposed between a vehicle body and a vehicle part and to be connected to a vehicle body and a vehicle part with fastening members to support the vehicle part, the cast support structure comprising:
    a body member made of a non-ferrous light alloy, wherein
    a flat surface portion is formed on a surface of the body member,
    a through hole into which one of the fastening members is to be inserted is formed in the body member, one end of the through hole opening on the flat surface portion,
    an electrochemical corrosion inhibitor is applied to an exposed surface of the flat surface portion which is connected to an engine compartment of the vehicle body,
    when the one of the fastening members is inserted into the through hole, a bearing surface of the one of the fastening members is in contact with the flat surface portion, and
    a step portion is formed, by spotfacing, on the surface of the body member so that the step portion continues with the flat surface portion.

12. The support structure according to claim 11, wherein the other end of the through hole opens on a connecting surface of the body member that is to be brought into contact with one of the vehicle body and the vehicle part.

13. The support structure according to claim 11, wherein a film thickness of the electrochemical corrosion inhibitor is in a range of from 20 μm to 50 μm.

14. The support structure according to claim 11, wherein the body member is a mount bracket.

15. The support structure according to claim 11, wherein the non-ferrous light alloy is selected from a group consisting of aluminum, an aluminum alloy, copper, a copper alloy, magnesium, and a magnesium alloy.

16. The support structure according to claim 11, wherein the electrochemical corrosion inhibitor is applied to a mounting surface a vehicle part is brought into contact with and a bearing surface of the at least one of the fastening members.

* * * * *